United States Patent
Squire (10) Patent No.: US 7,912,059 B1
(45) Date of Patent: Mar. 22, 2011

(54) METHODS, AGGREGATION DEVICES, AND COMPUTER PROGRAM PRODUCTS FOR DISTINGUISHING BETWEEN SUB-NETWORKS COUPLED TO AGGREGATION DEVICE PORTS BY USING AN INDEPENDENT SUB-NETWORK IDENTIFIER DOMAIN SPACE FOR EACH PORT

(75) Inventor: Matthew B. Squire, Raleigh, NC (US)

(73) Assignee: Hatteras Networks, Durham, NC (US)

( * ) Notice: Subject to any disclaimer, the term of this patent is extended or adjusted under 35 U.S.C. 154(b) by 2896 days.

(21) Appl. No.: 10/361,242

(22) Filed: Feb. 10, 2003

Related U.S. Application Data (60) Provisional application No. 60/355,032, filed on Feb. 8, 2002.

(51) Int. Cl.
*H04L 12/56* (2006.01)
(52) U.S. Cl. .................................. 370/392; 370/395.3
(58) Field of Classification Search .................. 370/389, 370/392, 395.3, 395.31, 395.32, 395.53, 370/401, 420, 535, 537
See application file for complete search history.

(56) References Cited

U.S. PATENT DOCUMENTS

| | | | | |
|---|---|---|---|---|
| 5,742,604 A | * | 4/1998 | Edsall et al. | 370/401 |
| 6,661,787 B1 | * | 12/2003 | O'Connell et al. | 370/389 |
| 6,765,914 B1 | * | 7/2004 | Jain et al. | 370/395.31 |
| 6,807,175 B1 | * | 10/2004 | Jennings et al. | 370/390 |
| 6,914,905 B1 | * | 7/2005 | Yip et al. | 370/395.53 |

\* cited by examiner

*Primary Examiner* — Pankaj Kumar
*Assistant Examiner* — Saba Tsegaye
(74) *Attorney, Agent, or Firm* — Myers Bigel Sibley & Sajovec, P.A.

(57) ABSTRACT

An aggregation device that connects a plurality of internal sub-networks processes a packet that is destined for one of the plurality of sub-networks. The aggregation device receives the packet and determines an internal sub-network identification value based on the combination of an external sub-network identification value that is in the packet, and a port of the aggregation device to which the one of the plurality of internal sub-networks is connected. The aggregation device may also determine an external sub-network identification value based on an internal sub-network identification value that is associated with a port of the aggregation device to which one of the plurality of internal sub-networks is connected. The external sub-network identification value is stored in the packet and the packet is transmitted on the port of the aggregation device to which the one of the plurality of internal sub-networks is connected.

60 Claims, 4 Drawing Sheets

METHODS, AGGREGATION DEVICES, AND COMPUTER PROGRAM PRODUCTS FOR DISTINGUISHING BETWEEN SUB-NETWORKS COUPLED TO AGGREGATION DEVICE PORTS BY USING AN INDEPENDENT SUB-NETWORK IDENTIFIER DOMAIN SPACE FOR EACH PORT

RELATED APPLICATIONS

This application claims the benefit of Provisional Application No. 60/355,032, filed Feb. 8, 2002, the disclosure of which is hereby incorporated herein by reference.

BACKGROUND OF THE INVENTION

The present invention relates to communication networks, and, more particularly, to distinguishing between sub-networks of a larger network at, for example, the layer two level, e.g., data link layer level.

A virtual local area network (VLAN) is a group of computers and/or other network resources that are treated as if they are connected to a single network segment. Thus, a VLAN comprises a collection of ports over which certain packets are replicated and may be viewed as a connected sub-network of a larger network. A packet is classified into a VLAN at the point of ingress and, if the packet is a multicast packet or if there is a destination lookup failure, then that packet is forwarded to all of the active ports comprising the VLAN. In this way, a VLAN improves network performance by segmenting the network. In contrast with conventional switching systems, broadcast traffic and node-to-node traffic is restricted to certain ports comprising the VLAN so as to reduce the amount of traffic in the network.

In general, there are many ways that a packet gets assigned to a VLAN. One way is based on switch ports. Specifically, an administrator assigns a port of a switch to a particular VLAN. The second way is based on a packet's Medium Access Control (MAC) address. A switch can maintain a table of MAC addresses and their VLAN associations. The third way a packet is assigned to a VLAN is based on layer three addressing and/or the protocol used to transmit/receive the packet. Other methods are also possible.

When a packet travels between switches, VLAN membership may be indicated implicitly or explicitly. Implicit VLAN membership has been described above. An example would be if all switches that support a particular VLAN share a common table containing the member MAC addresses. Explicit VLAN membership is indicated by using a VLAN tag, which is implemented as a 12-bit, fixed position field in each packet. Switches can quickly examine the VLAN tag and determine the VLAN to which an ingress packet is a member. This provides a generally more efficient VLAN classification algorithm.

Because a 12-bit field is used for a VLAN tag, an Ethernet network, for example, can support as many as 4096 (4K) VLANs. In existing VLAN capable devices, VLAN identification of a packet upon ingress is generally determined by a switch by evaluating whether VLAN tagging is used and whether the packet's EtherType field corresponds to a specific protocol. If so, then an internal VLAN identifier is set to the VLAN tag value contained in the packet. Otherwise, an internal VLAN identifier is set to a default value. VLAN realization of a packet on egress may be determined by the switch by evaluating whether VLAN tagging is used and, if so, then the packet's VLAN tag value is set to an appropriate value based on the destination and the packet's EtherType field is set to the desired protocol. In a conventional Ethernet network supporting VLANs, there is a one-to-one map between external VLAN tags and internal VLAN identifiers. Moreover, because internal VLAN identifiers are global identifiers in an aggregation device, such as a switch or router, the entire aggregation device is limited to 4K unique VLANs.

When an Ethernet switch is deployed in a network where it is shared among multiple independent domains, it may become necessary to coordinate VLAN tag usage among the users on that switch so that the domains remain independent. A carrier/network operator that services many clients may find such VLAN tag coordination to be a heavy burden and the operator's customers may be unhappy with the restrictions imposed to maintain the independent VLAN tag domains.

A carrier/network operator may instead configure an Ethernet switch to ignore VLAN tags so as to treat all packets as untagged to reduce the administrative burden of coordinating VLAN tag usage among multiple customers. Ignoring VLAN tags in a packet may be referred to as "VLAN tag stacking." This is because when an Ethernet switch ignores a VLAN tag value, multiple VLAN tags may be stacked on the front of the packet. For example, upon ingress, a switch may examine a packet by evaluating whether VLAN tagging is used and whether the packet's EtherType field indicates that the packet is indeed tagged. By ignoring an already present VLAN tag and treating the packet as untagged, a tagged packet may receive one or more additional tags.

VLAN tag stacking does not increase the number of VLANs in a network. Instead, it aggregates many VLANs into one by ignoring existing VLAN identifiers. Both the network and aggregation devices, such as switches and routers, continue to be limited to at most 4K VLANs.

Use of Ethernet technology is expanding from traditional applications, such as LAN networks, to the more demanding environment of core and access networks. It may be difficult, however, to prevent interference between customer network configurations in a large-scale carrier Ethernet deployment. For example, when two customers with overlapping VLAN identifiers attach to the same device, the separate customer VLANs cannot be merged because they use one or more common identifiers, i.e., VLAN tag values. A carrier and/or network operator may use VLAN tag stacking to effectively ignore the customer VLAN identifiers and maintain separate connectivity of the customers' VLANs. Unfortunately, when a carrier provides multiple services over a single physical link to a customer, the VLAN tag may also be used to identify the service a particular packet is associated with. Thus, service unbundling may require differentiation based on VLAN tag values. Because VLAN tag stacking ignores the VLAN tags on customer ports, VLAN tag stacking does not support service unbundling based on VLAN tag values in Ethernet access networks.

Carrier/network operators may also be faced with the issue of how to support large numbers of VLANs. For example, how would a device and a network support thousands of customers, each having potentially multiple VLANs? As discussed above, the 12-bit VLAN tag field limits a device and/or network to a maximum of 4K V LANs.

Another problem that carriers may face is the need to provide layer two connectivity between two independent administrative domains. Similar to the issue discussed above with different customers, there may be overlap between the VLAN identifiers used in the two administrative domains. In some cases, however, the carrier must provide connectivity between these two domains. This may require re-mapping and/or translation of VLAN tag values between the two administrative domains.

SUMMARY OF THE INVENTION

According to some embodiments of the present invention, an aggregation device that connects a plurality of internal sub-networks processes a packet that is destined for one of the plurality of sub-networks. The aggregation device receives the packet and determines an internal sub-network identification value based on the combination of an external sub-network identification value that is in the packet, and a port of the aggregation device to which the one of the plurality of internal sub-networks is connected.

In other embodiments, the internal sub-network identification value is determined by associating a data structure with the port. The data structure associates external sub-network identification values with internal sub-network identification values. In particular embodiments, the data structure is a table and the external sub-network identification value is used to index the table to obtain the internal sub-network identification value.

In still other embodiments, the internal sub-network identification value is determined by storing internal sub-network identification values in a hash table. The hash table is accessed using a combination of the port and the external sub-network identification value as a key to obtain the internal sub-network identification value.

In still other embodiments, the internal sub-network identification value is determined by providing a content addressable memory (CAM). A combination of the port and the external sub-network identification value is used to access a memory location in the CAM to obtain the internal sub-network identification value stored thereat.

Thus, in accordance with some embodiments of the present invention, a per-port function and/or data structure may be used to allow mapping between external and internal sub-network identifiers.

In further embodiments of the present invention, the plurality of internal sub-networks comprises a plurality of virtual local area networks (VLANs), respectively, and the external sub-network identification value is a VLAN tag value.

In still further embodiments of the present invention, the plurality of VLANs communicates with the aggregation device using the Ethernet networking standard.

In still further embodiments of the present invention, the packet comprises an EtherType protocol value indicating that the packet contains a VLAN tag value and is to be treated as a tagged packet.

In additional embodiments of the present invention, the aggregation device is a router or a switch.

In other embodiments, the aggregation device determines an external sub-network identification value based on an internal sub-network identification value that is associated with a port of the aggregation device to which one of the plurality of internal sub-networks is connected. The external sub-network identification value is stored in the packet and the packet is transmitted on the port of the aggregation device to which the one of the plurality of internal sub-networks is connected.

Although described primarily above with respect to method aspects of distinguishing between sub-networks coupled to ports of an aggregation device, it will be understood that the present invention may also be embodied as aggregation devices and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

Embodiments of the present invention are described herein in the context of processing a packet. It will be understood that the term "packet" means a unit of information that may be transmitted electronically as a whole from one device to another. Accordingly, as used herein, the term "packet" may encompass such terms of art as "frame" or "message," which may also be used to refer to a unit of transmission.

The present invention may be embodied as methods, aggregation devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Figure 1:
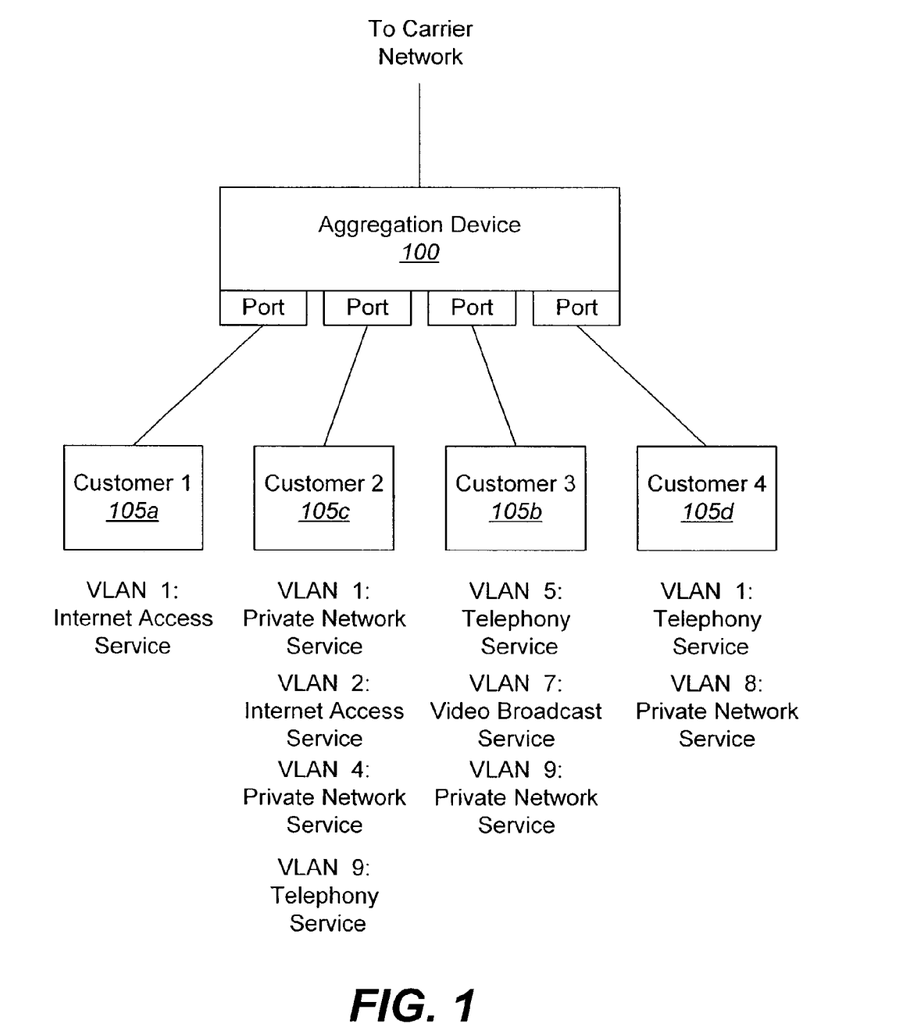
FIG. 1 is a block diagram that illustrates a communication network model in accordance with some embodiments of the present invention.

FIG. 1 illustrates a communication network model in accordance with some embodiments of the present invention. As shown in FIG. 1, an aggregation device 100, such as a switch or router, aggregates data links from multiple customers 105a, 105b, 105c, and 105d onto a carrier/network provider's network through a plurality of ports. Each customer 105a, 105b, 105c, and 105d has one or more VLANs or sub-networks associated therewith. Moreover, the VLAN or sub-network identifier domain space overlaps among the various customers. For example, three customers have a VLAN 1 and two customers have a VLAN 9. The customers 105a, 105b, 105c, and 105d also use the VLAN or sub-network identifiers to provide multiple services over the same physical infrastructure. Note that different customers identify the same service with different identifiers (i.e., VLAN or sub-network identifiers). As will be described hereafter, embodiments of the present invention may allow services to be identified independently on each link through the use of an independent VLAN or sub-network identifier space for each port of the aggregation device 100.

Embodiments of the present invention are discussed herein in the context of using Ethernet data links between the aggregation device 100 and the customer premises. It will be understood, however, that the present invention is not limited to the Ethernet communication standard. Other communication standards that support the operations described herein may also be used in further embodiments of the present invention.

Figure 2:
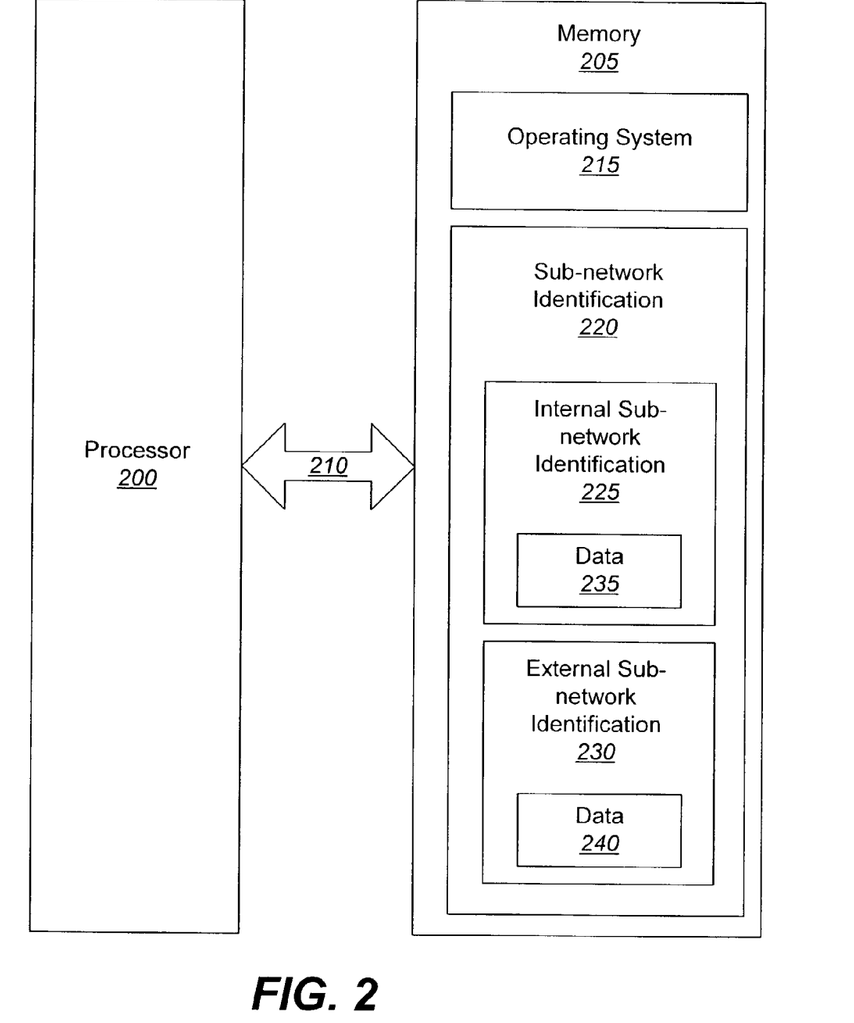
FIG. 2 is a block diagram that illustrates a software architecture for use in an aggregation device in accordance with some embodiments of the present invention.

FIG. 2 illustrates a processor 200 and memory 205 that may be used in embodiments of aggregation devices, such as, for example, the aggregation device 100 of FIG. 1, in accordance with the present invention. The processor 200 communicates with the memory 205 via an address/data bus 210. The processor 200 may be, for example, a commercially available or custom microprocessor. The memory 205 is representative of the one or more memory devices containing the software and data used to facilitate distinguishing between VLANs/sub-networks coupled to ports of an aggregation device by using an independent VLAN/sub-network identifier domain space for each port, in accordance with some embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to two or more categories of software and/or data: an operating system 215 and a sub-network identification module 220. The operating system 215 generally controls the operation of the aggregation device. In particular, the operating system 215 may manage the aggregation device's software and/or hardware resources and may coordinate execution of programs by the processor 200. The sub-network identification module 220 comprises an internal sub-network identification module 225 and an external sub-network identification module 230. The internal sub-network identification module 225 may be configured to determine an internal sub-network identification value based on an external sub-network identification value, such as a VLAN tag value, that is used in the carrier network and stored in the packet and a port of the aggregation device to which one of the plurality of internal sub-networks or VLANs is coupled. The external sub-network identification module 230 may be configured to determine an external sub-network identification value, such as a VLAN tag value, that is used in the carrier network based on an internal sub-network identification value that is associated with a port of the aggregation device to which one of the plurality of internal sub-networks or VLANs is coupled. To assist in making these determinations, the internal sub-network identification module 225 and the external sub-network identification module 230 comprise data modules 235 and 240, respectively. These data modules 235 and 240 may represent software data structures, such as arrays, lists, tables, and/or hash tables. One or both of the data modules 235 and 240 may also represent content addressable memory (CAM) modules.

Although FIG. 2 illustrates an exemplary aggregation device software architecture in accordance with some embodiments of the present invention, it will be understood that the present invention is not limited to such a configuration but is intended to encompass any configuration capable of carrying out operations described herein.

Computer program code for carrying out operations of aggregation devices discussed above with respect to FIG. 2 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, systems, and computer program products in accordance with exemplary embodiments of the invention. These flowchart and/or block diagrams further illustrate exemplary operations of distinguishing between sub-networks coupled to ports of an aggregation device by using an independent sub-network identifier domain space for each port, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
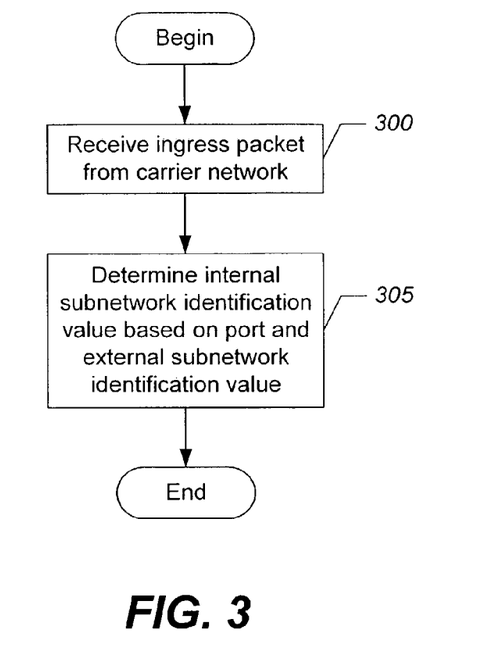
FIGS. 3 and 4 are flowcharts that illustrate operations for distinguishing between sub-networks coupled to ports of an aggregation device by using an independent sub-network identifier domain space for each port.
Figure 4:
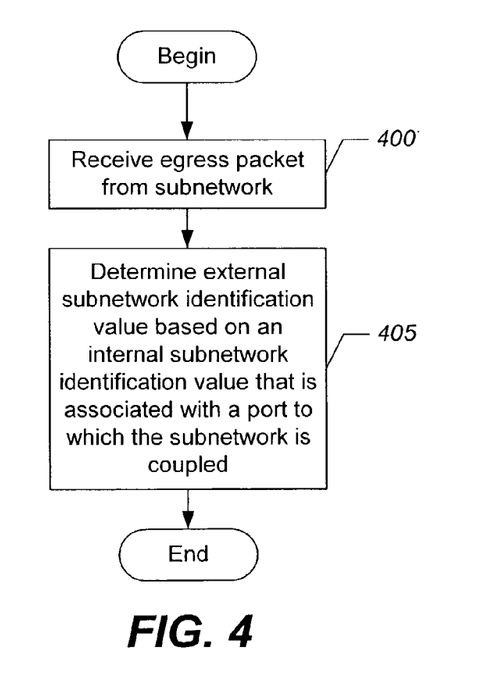

Referring now to FIGS. 3 and 4, exemplary operations for distinguishing between sub-networks, such as, for example, VLANs, coupled to ports of an aggregation device by using an independent sub-network identifier domain space for each port. Operations for processing a packet from the carrier network destined for a sub-network, such as a VLAN, begin at block 300 of FIG. 3 where the packet is received by the aggregation device, such as the aggregation device 100 of FIG. 1. The internal sub-network identification module 225 of FIG. 2 may examine the packet to evaluate whether VLAN tagging is used and whether the packet's EtherType field indicates that the packet is indeed tagged and should be treated as having a VLAN tag value. If this is the case, then, in contrast with conventional aggregation devices, instead of directly mapping a VLAN tag value, for example, to an internal sub-network or VLAN identification value, the internal sub-network identification module 225 determines, at block 305, the internal sub-network identification value or VLAN identification value based on both the port via which the sub-network or VLAN is coupled to the aggregation device and the external sub-network identification value, e.g., the VLAN tag value contained in the packet. Advantageously, because the internal sub-network or VLAN identification value is no longer tied to the VLAN tag value, it is not limited to 12-bits. Thus, an aggregation device and a network may support more than 4K sub-networks or VLANs. These internal sub-network or VLAN identification values may have services associated therewith and, because they are unique they may provide an architecture for Ethernet service unbundling.

To facilitate determination of the internal sub-network identification value or VLAN identification value, the data module 235 of FIG. 2 may comprise a plurality of data structures that are associated with the aggregation device's ports, respectively. These data structures associate external sub-network identification values, e.g., VLAN tag values, with internal sub-network identification values or VLAN identification values. In particular embodiments, the data structures may be tables or arrays and the external sub-network identification value is used to index the table for a particular port to obtain the internal sub-network identification value.

In other embodiments, the data module 235 may comprise a hash table having internal sub-network identification values or VLAN identification values stored therein. The hash table is accessed using a combination of the port and the external sub-network identification value as a key to obtain the internal sub-network identification value.

In other embodiments, the data module 235 comprises a content addressable memory (CAM). A combination of the port and the external sub-network identification value is used to access a memory location in the CAM to obtain the internal sub-network identification value or VLAN identification value stored thereat.

On egress, similar operations are performed to determine the tag to place in a packet for a particular internal sub-network or VLAN identification value. Operations for processing a packet from an internal sub-network, such as a VLAN, destined for the carrier network begin at block 400 of FIG. 4 where the packet is received by the aggregation device, such as the aggregation device 100 of FIG. 1. The external sub-network identification module 230 of FIG. 2 may examine the packet to evaluate whether VLAN tagging is used. If this is the case, then the external sub-network identification module 230 determines, at block 405, the external sub-network identification value that is used in the carrier network based on an internal sub-network identification value that is associated with a port of the aggregation device to which the internal sub-network or VLAN is coupled.

To facilitate determination of the external sub-network identification value or VLAN tag value, the data module 240 of FIG. 2 may comprise a data structure in which internal sub-network identification values or VLAN identification values are associated with external sub-network identification values or VLAN tag values. In particular embodiments, the data structure may be a table or array and the internal sub-network identification value is used to index the table to obtain the external sub-network identification value.

In other embodiments, the data module 240 may comprise a hash table having external sub-network identification or VLAN tag values stored therein. The hash table is accessed using a combination of the port and the internal sub-network identification value as a key to obtain the external sub-network identification value.

In still other embodiments, the data module 240 comprises a content addressable memory (CAM). A combination of the port and the internal sub-network identification value is used to access a memory location in the CAM to obtain the external sub-network identification value stored thereat.

The flowcharts of FIGS. 3 and 4 illustrate the architecture, functionality, and operations of embodiments of the aggregation device 100 software. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

Figure 5:
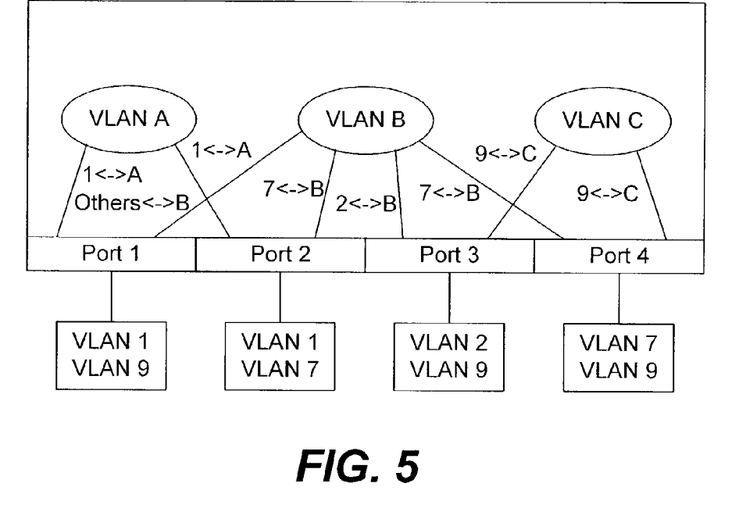
FIG. 5 is a block diagram that illustrates a communication network model incorporating Ethernet switching using VLAN tagging in accordance with some embodiments of the present invention.

FIG. 5 is a block diagram that illustrates a communication network model incorporating Ethernet switching using VLAN tagging in accordance with some embodiments of the present invention. As shown in FIG. 5, multiple ports provide multiple services (VLANs) based upon the VLAN tag. Each port maintains a function that maps the external VLAN tag (1, 2, 7, 9, etc.) to the internal VLAN identifier (A, B, C, etc.). Additionally, as shown with respect to port 1, a port may contain a default mapping that classifies all other unspecified VLAN tags into a particular service.

Advantageously, embodiments of the present invention may allow internal sub-networks or VLANS coupled to ports of an aggregation device to be distinguished by using an independent sub-network identifier domain space for each port. Using independent VLAN domains per port allows an internal sub-network or VLAN space that is greater than the conventional limit of 4K based on the size of the VLAN tag field. Moreover, a flexible service connectivity architecture is provided for service unbundling. Embodiments of the present invention may also address the scalability and manageability concerns that hinder Ethernet deployments in core and access networks.

Many variations and modifications can be made to the preferred embodiments without substantially departing from the principles of the present invention. All such variations and modifications are intended to be included herein within the scope of the present invention, as set forth in the following claims.

I claim:

1. A method of processing a packet in an aggregation device that connects a plurality of internal sub-networks, comprising:

receiving a packet that is destined for one of the plurality of internal sub-networks; and determining an internal sub-network identification value based on an external sub-network identification value stored in the packet and a port of the aggregation device to which the one of the plurality of internal sub-networks is connected.

2. The method of claim 1, wherein determining the internal sub-network identification value comprises:

associating a data structure with the port, the data structure associating external sub-network identification values with internal sub-network identification values.

3. The method of claim 2, wherein the data structure is a table, and wherein determining the internal sub-network identification value comprises:

using the external sub-network identification value to index the table to obtain the internal sub-network identification value.

4. The method of claim 1, wherein determining the internal sub-network identification value comprises:

storing internal sub-network identification values in a hash table; and accessing the hash table using a combination of the port and the external sub-network identification value as a key to obtain the internal sub-network identification value.

5. The method of claim 1, wherein determining the internal sub-network identification value comprises:

providing a content addressable memory (CAM); and using a combination of the port and the external sub-network identification value to access a memory location in the CAM to obtain the internal sub-network identification value stored thereat.

6. The method of claim 1, wherein the plurality of internal sub-networks comprise a plurality of virtual local area networks (VLANs), respectively, and wherein the external sub-network identification value is a VLAN tag value.

7. The method of claim 6, wherein the plurality of VLANs communicate with the aggregation device using the Ethernet networking standard.

8. The method of claim 7, wherein receiving the packet comprises:

receiving the packet that is destined for one of the plurality of internal sub-networks, the packet comprising an EtherType protocol value indicating that the packet is to be treated as if it does have a VLAN tag value.

9. The method of claim 1, wherein the aggregation device is a router.

10. The method of claim 1, wherein the aggregation device is a switch.

11. A method of processing a packet in an aggregation device that connects a plurality of internal sub-networks, comprising:

determining an external sub-network identification value used in a carrier network based on a port of the aggregation device to which the one of the plurality of internal sub-networks is connected and based on an internal sub-network identification value that is associated with the port;

storing the external sub-network identification value in the packet; and transmitting the packet on the carrier network.

12. The method of claim 11, wherein determining the external sub-network identification value comprises:

associating internal sub-network identification values with external sub-network identification values in a data structure.

13. The method of claim 12, wherein the data structure is a table, and wherein determining the external sub-network identification value comprises:

using the internal sub-network identification value to index the table to obtain the external sub-network identification value.

14. The method of claim 11, wherein determining the external sub-network identification value comprises:

storing external sub-network identification values in a hash table; and accessing the hash table using a combination of the port and the internal sub-network identification value as a key to obtain the internal sub-network identification value.

15. The method of claim 11, wherein determining the external sub-network identification value comprises:

providing a content addressable memory (CAM); and using a combination of the port and the internal sub-network identification value to access a memory location in the CAM to obtain the external sub-network identification value stored thereat.

16. The method of claim 11, wherein the plurality of internal sub-networks comprise a plurality of virtual local area networks (VLANs), respectively, and wherein the external sub-network identification value is a VLAN tag value.

17. The method of claim 16, wherein the plurality of VLANs communicate with the aggregation device using the Ethernet networking standard.

18. The method of claim 17, further comprising:

setting an EtherType protocol to a value indicating that the packet is to be treated as if it does have a VLAN tag value.

19. The method of claim 11, wherein the aggregation device is a router.

20. The method of claim 11, wherein the aggregation device is a switch.

21. An aggregation device that connects a plurality of internal sub-networks, comprising:

means for receiving a packet that is destined for one of the plurality of internal sub-networks; and means for determining an internal sub-network identification value based on an external sub-network identification value stored in the packet and a port of the aggregation device to which the one of the plurality of internal sub-networks is connected.

22. The aggregation device of claim 21, wherein the means for determining the internal sub-network identification value comprises:

means for associating a data structure with the port, the data structure associating external sub-network identification values with internal sub-network identification values.

23. The aggregation device of claim 22, wherein the data structure is a table, and wherein the means for determining the internal sub-network identification value comprises:

means for using the external sub-network identification value to index the table to obtain the internal sub-network identification value.

24. The aggregation device of claim 21, wherein the means for determining the internal sub-network identification value comprises:

means for storing internal sub-network identification values in a hash table; and means for accessing the hash table using a combination of the port and the external sub-network identification value as a key to obtain the internal sub-network identification value.

25. The aggregation device of claim 21, wherein the means for determining the internal sub-network identification value comprises:
 means for providing a content addressable memory (CAM); and
 means for using a combination of the port and the external sub-network identification value to access a memory location in the CAM to obtain the internal sub-network identification value stored thereat.

26. The aggregation device of claim 21, wherein the plurality of internal sub-networks comprise a plurality of virtual local area networks (VLANs), respectively, and wherein the external sub-network identification value is a VLAN tag value.

27. The aggregation device of claim 26, wherein the plurality of VLANs communicate with the aggregation device using the Ethernet networking standard.

28. The aggregation device of claim 27, wherein the means for receiving the packet comprises:
 means for receiving the packet that is destined for one of the plurality of internal sub-networks, the packet comprising an EtherType protocol value indicating that the packet is to be treated as if it does have a VLAN tag value.

29. The aggregation device of claim 21, wherein the aggregation device is a router.

30. The aggregation device of claim 21, wherein the aggregation device is a switch.

31. An aggregation device that connects a carrier network to a plurality of internal sub-networks, comprising:
 means for determining an external sub-network identification value used in a carrier network based on a port of the aggregation device to which the one of the plurality of internal sub-networks is connected and based on an internal sub-network identification value that is associated with the port;
 means for storing the external sub-network identification value in the packet; and
 means for transmitting the packet on the carrier network.

32. The aggregation device of claim 31, wherein the means for determining the external sub-network identification value comprises:
 means for associating internal sub-network identification values with external sub-network identification values in a data structure.

33. The aggregation device of claim 32, wherein the data structure is a table, and wherein the means for determining the external sub-network identification value comprises:
 means for using the internal sub-network identification value to index the table to obtain the external sub-network identification value.

34. The aggregation device of claim 31, wherein the means for determining the external sub-network identification value comprises:
 means for storing external sub-network identification values in a hash table; and
 means for accessing the hash table using a combination of the port and the internal sub-network identification value as a key to obtain the internal sub-network identification value.

35. The aggregation device of claim 31, wherein the means for determining the external sub-network identification value comprises:
 means for providing a content addressable memory (CAM); and
 means for using a combination of the port and the internal sub-network identification value to access a memory location in the CAM to obtain the external sub-network identification value stored thereat.

36. The aggregation device of claim 31, wherein the plurality of internal sub-networks comprise a plurality of virtual local area networks (VLANs), respectively, and wherein the external sub-network identification value is a VLAN tag value.

37. The aggregation device of claim 36, wherein the plurality of VLANs communicate with the aggregation device using the Ethernet networking standard.

38. The aggregation device of claim 37, further comprising:
 means for setting an EtherType protocol to a value indicating that the packet is to be treated as if it does have a VLAN tag value.

39. The aggregation device of claim 31, wherein the aggregation device is a router.

40. The aggregation device of claim 31, wherein the aggregation device is a switch.

41. A computer program product for processing a packet in an aggregation device that connects a plurality of internal sub-networks, comprising:
 a non-transitory computer readable storage medium having computer readable program code embodied therein, the computer readable program code comprising:
 computer readable program code configured to receive a packet that is destined for one of the plurality of internal sub-networks; and
 computer readable program code configured to determine an internal sub-network identification value based on an external sub-network identification value stored in the packet and a port of the aggregation device to which the one of the plurality of internal sub-networks is connected.

42. The computer program product of claim 41, wherein the computer readable program code configured to determine the internal sub-network identification value comprises:
 computer readable program code configured to associate a data structure with the port, the data structure associating external sub-network identification values with internal sub-network identification values.

43. The computer program product of claim 42, wherein the data structure is a table, and wherein the computer readable program code configured to determine the internal sub-network identification value comprises:
 computer readable program code configured to use the external sub-network identification value to index the table to obtain the internal sub-network identification value.

44. The computer program product of claim 41, wherein the computer readable program code configured to determine the internal sub-network identification value comprises:
 computer readable program code configured to store internal sub-network identification values in a hash table; and
 computer readable program code configured to access the hash table using a combination of the port and the external sub-network identification value as a key to obtain the internal sub-network identification value.

45. The computer program product of claim 41, wherein the computer readable program code configured to determine the internal sub-network identification value comprises:
 computer readable program code configured to provide a content addressable memory (CAM); and
 computer readable program code configured to use a combination of the port and the external sub-network identification value to access a memory location in the CAM to obtain the internal sub-network identification value stored thereat.

46. The computer program product of claim 41, wherein the plurality of internal sub-networks comprise a plurality of virtual local area networks (VLANs), respectively, and wherein the external sub-network identification value is a VLAN tag value.

47. The computer program product of claim 46, wherein the plurality of VLANs communicate with the aggregation device using the Ethernet networking standard.

48. The computer program product of claim 47, wherein the computer readable program code configured to receiving the packet comprises:
  computer readable program code configured to receive the packet that is destined for one of the plurality of internal sub-networks, the packet comprising an EtherType protocol value indicating that the packet is to be treated as if it does have a VLAN tag value.

49. The computer program product of claim 41, wherein the aggregation device is a router.

50. The computer program product of claim 41, wherein the aggregation device is a switch.

51. A computer program product for processing a packet in an aggregation device that connects a plurality of internal sub-networks, comprising:
  a non-transitory computer readable storage medium having computer readable program code embodied therein, the computer readable program code comprising:
    computer readable program code configured to determine an external sub-network identification value used in a carrier network based on a port of the aggregation device to which the one of the plurality of internal sub-networks is connected and based on an internal sub-network identification value that is associated with the port;
    computer readable program code configured to store the external sub-network identification value in the packet; and
    computer readable program code configured to transmit the packet on the carrier network.

52. The computer program product of claim 51, wherein the computer readable program code configured to determine the external sub-network identification value comprises:
  computer readable program code configured to associate internal sub-network identification values with external sub-network identification values in a data structure.

53. The computer program product of claim 52, wherein the data structure is a table, and wherein the computer readable program code configured to determine the external sub-network identification value comprises:
  computer readable program code configured to use the internal sub-network identification value to index the table to obtain the external sub-network identification value.

54. The computer program product of claim 51, wherein the computer readable program code configured to determine the external sub-network identification value comprises:
  computer readable program code configured to store external sub-network identification values in a hash table; and
  computer readable program code configured to access the hash table using a combination of the port and the internal sub-network identification value as a key to obtain the internal sub-network identification value.

55. The computer program product of claim 51, wherein the computer readable program code configured to determine the external sub-network identification value comprises:
  computer readable program code configured to provide a content addressable memory (CAM); and
  computer readable program code configured to use a combination of the port and the internal sub-network identification value to access a memory location in the CAM to obtain the external sub-network identification value stored thereat.

56. The computer program product of claim 51, wherein the plurality of internal sub-networks comprise a plurality of virtual local area networks (VLANs), respectively, and wherein the external sub-network identification value is a VLAN tag value.

57. The computer program product of claim 56, wherein the plurality of VLANs communicate with the aggregation device using the Ethernet networking standard.

58. The computer program product of claim 57, further comprising:
  computer readable program code configured to set an EtherType protocol to a value indicating that the packet is to be treated as if it does have a VLAN tag value.

59. The computer program product of claim 51, wherein the aggregation device is a router.

60. The computer program product of claim 51, wherein the aggregation device is a switch.

* * * * *